(12) United States Patent
Kantamneni et al.

(10) Patent No.: US 11,593,868 B1
(45) Date of Patent: Feb. 28, 2023

(54) REAL-TIME VIRTUAL TRY-ON ITEM MODELING

(71) Applicant: Mirelz Inc., Plano, TX (US)

(72) Inventors: Harish Kantamneni, Plano, TX (US); Pratima Adusumilli, Plano, TX (US)

(73) Assignee: Mirelz Inc., Plano, TX (US)

( * ) Notice: Subject to any disclaimer, the term of this patent is extended or adjusted under 35 U.S.C. 154(b) by 470 days.

(21) Appl. No.: 16/731,716

(22) Filed: Dec. 31, 2019

Related U.S. Application Data

(60) Provisional application No. 62/786,760, filed on Dec. 31, 2018.

(51) Int. Cl.
| | | |
|---|---|---|
| *G06T 19/20* | (2011.01) | |
| *G06Q 30/0601* | (2023.01) | |
| *G06T 7/73* | (2017.01) | |
| *G06T 7/68* | (2017.01) | |
| *G06T 19/00* | (2011.01) | |
| *G06V 40/16* | (2022.01) | |

(52) U.S. Cl.
CPC ........... *G06Q 30/0643* (2013.01); *G06T 7/68* (2017.01); *G06T 7/75* (2017.01); *G06T 19/006* (2013.01); *G06T 19/20* (2013.01); *G06V 40/171* (2022.01)

(58) Field of Classification Search
CPC .... G06T 19/006; G06T 19/20; G06Q 30/0643
See application file for complete search history.

(56) References Cited

U.S. PATENT DOCUMENTS

| | | |
|---|---|---|
| 6,624,843 B2 | 9/2003 | Lennon |
| 7,133,839 B2 | 11/2006 | Inoue |
| 8,606,645 B1 | 12/2013 | Applefeld |
| 9,646,340 B2 | 5/2017 | Kapur |
| 10,755,487 B1 | 8/2020 | Snibbe |
| 2013/0113829 A1 | 5/2013 | Suzuki |
| 2014/0035913 A1 | 2/2014 | Higgins |
| 2014/0149264 A1 | 5/2014 | Satyanarayana |
| 2017/0032577 A1* | 2/2017 | Smith ................ G06V 40/103 |

(Continued)

OTHER PUBLICATIONS

Huang et al., Human-Centric Design Personalization of 3D glasses Frame in Markerless Augmented Reality, Advanced Engineering Informatics 26, 2012, pp. 35-45 (Year: 2012).*

(Continued)

*Primary Examiner* — Charles Tseng

(57) ABSTRACT

A method includes generating, based on user images, a user 3-D model. The method proceeds with obtaining, via a user interface, a request to graphically represent an accessory on to a user graphical representation. This user graphical representation is generated using the user 3-D model. In response to this request, an accessory 3-D model is obtained. Further, the method includes positioning, via the user interface and based on parameters of the user 3-D model and of the accessory 3-D model, an accessory graphical representation on to the user graphical representation. The method further includes updating, in response to detecting user movement, the user 3-D model and the accessory 3-D model and presenting, via the user interface and based on these updated 3-D models, the accessory graphical representation and the user graphical representation in accordance with the user movement.

20 Claims, 11 Drawing Sheets

(56) References Cited

U.S. PATENT DOCUMENTS

2017/0270581 A1    9/2017    Tang

OTHER PUBLICATIONS

Pachoulakis et al., Augmented Reality Platforms for Virtual Fitting Rooms, The International Journal of Multimedia and Its Applications, 2012, pp. 35-46 (Year: 2012).*
https://www.retaildive.com/ex/mobilecommercedaily/rimmel-unveils-augmented-reality-mirror-virtual-try-on-options-for-cosmetics (Year: 2017).

* cited by examiner

REAL-TIME VIRTUAL TRY-ON ITEM MODELING

CROSS-REFERENCE TO RELATED APPLICATIONS

This application claims the benefit of, and priority to, U.S. Provisional Patent Application No. 62/786,760, filed Dec. 31, 2018, entitled "TRUE LOOK FOR VIRTUAL TRY-ON OF ACCESSORIES," the contents of which are incorporated herein by reference in their entirety.

FIELD OF THE INVENTION

The present disclosure relates to a virtual try-on environment that models try-on accessories in real-time to provide an accurate representation of the accessories.

BACKGROUND

With the advent of augmented reality (AR) technologies, a user can superimpose computer-generated images of various accessories on to a graphical representation of the user's real-world environment. For instance, retailers often use AR technologies, implemented on an application and/or website, to create a realistic try-on experience for their customers. A customer, accessing the application and/or website, may superimpose a computer-generated image of an accessory over a real-world image of the customer to allow the customer to determine how the accessory would look on the customer without having to physically don the accessory in a physical store.

However, the appearance of these accessories during a virtual try-on session can be unrealistic. For instance, the size of an accessory, when represented in an AR environment during a virtual try-on session, can often be inaccurate. Further, the image of the accessory, as presented in the AR environment, can appear artificial and crudely pasted on to the user's image. Further, as the user moves in the real-world environment, the image of the accessory often remains stationary, which prevents the user from being able to discern how the accessory's position and look would change with the movement of the user. These concerns can worsen a user experience during a virtual try-on session.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A method can include generating, based on one or more images of a user, a user three-dimensional (3-D) model. The method further includes obtaining, via a user interface, a request to graphically represent an accessory on a user graphical representation. This user graphical representation is generated using the user 3-D model. In response to this request, an accessory 3-D model is obtained. The method proceeds with positioning, via the user interface and based on parameters of the user 3-D model and of the accessory 3-D model, an accessory graphical representation on to the the user graphical representation. Further, the method includes updating, in response to detecting user movement, the user 3-D model and the accessory 3-D model and presenting, via the user interface and based on these updated 3-D models, the accessory graphical representation and the user graphical representation in accordance with the user movement.

A system can include one or more processors and memory that includes instructions that, as a result of being executed by the one or more processors, cause the system to obtain a request to graphically represent an accessory on a user graphical representation, whereby the user graphical representation is generated using a user 3-D model. The system further obtains, in response to this request, an accessory 3-D model. Once the accessory 3-D model has been obtained, the system positions an accessory graphical representation on to the user graphical representation displayed via a user interface. The accessory graphical representation is positioned by the system based on an orientation of the user 3-D model and by using the accessory 3-D model. In response to detecting user movement, the system further updates the user 3-D model and the accessory 3-D model, resulting in an updated user 3-D model and an updated accessory 3-D model. The system, through the user interface and based on these updated 3-D models, presents the accessory graphical representation on the user graphical representation in accordance with the user movement.

A non-transitory computer-readable storage medium can include instructions which, as a result of being executed by one or more processors, cause the one or more processors to obtain, via a user interface, a request to graphically represent an accessory on a user graphical representation. The user graphical representation is generated using a user 3-D model. In response to the request, the computer system obtains an accessory 3-D model of the accessory. Further, using the accessory 3-D model and based on an orientation of the user 3-D model, the computer system positions, via the user interface, an accessory graphical representation on to the user graphical representation. In response to detecting user movement, the computer system updates the user 3-D model and the accessory 3-D model, resulting in a set of updated 3-D models. Further, the computer system presents, via the user interface, the accessory graphical representation on the user graphical representation in accordance with the user movement. This presentation is performed based on the updated 3-D models.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these figures depict only exemplary embodiments of the disclosure and are not therefore to be considered to be limiting of its scope, the principles herein are described and explained with additional specificity and detail through the use of the accompanying drawings in which.

DETAILED DESCRIPTION

In accordance with some embodiments of the disclosed subject matter, mechanisms (which can include systems, methods, devices, apparatuses, etc.) for providing an accurate graphical representation of accessories based on the orientation and movements of a user during a virtual try-on session.

Figure 1:
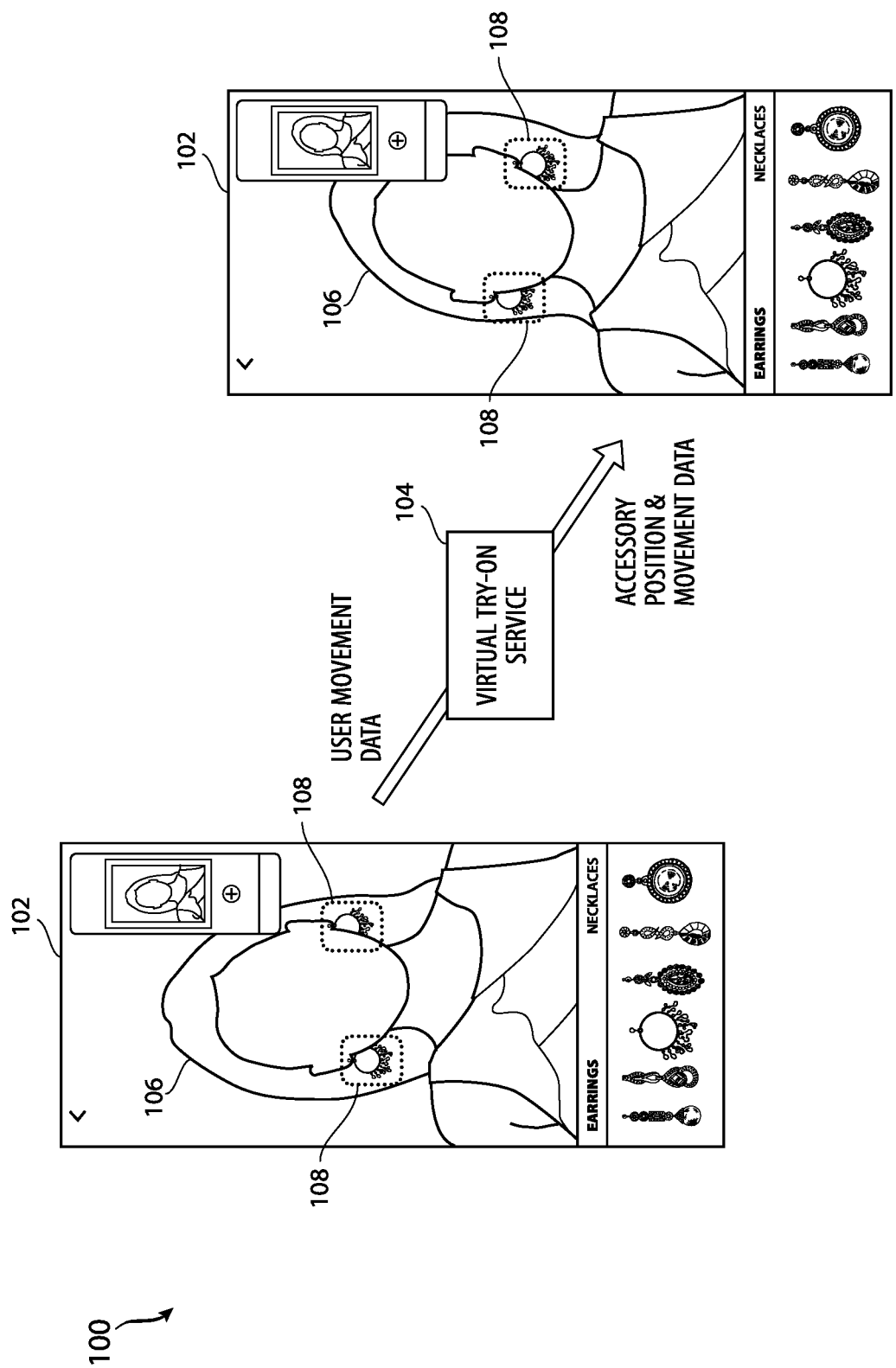
FIG. 1 shows an illustrative example of an environment in which various embodiments can be implemented.

FIG. 1 shows an illustrative example of an environment 100 in which various embodiments can be implemented. In the environment 100, a user, via a user computing device, initiates a virtual try-on session. The caller computing device may comprise hardware, firmware, and/or software, and can take any of a variety of form factors. Typical examples of such form factors include laptops, smartphones, small form factor personal computers, personal digital assistants, rackmount devices, and so on. In an embodiment, the caller computing device includes one or more peripheral devices, such as a touchscreen display or other display element (e.g., screen, monitor, etc.), a camera, a lighting element (e.g., flash, light-emitting diode (LED), etc.), and the like.

In an embodiment, the user computing device comprises a virtual try-on session application that may be used to access a virtual try-on service 104 to obtain one or more graphical models that may be used to render accessory graphical representations, such as accessory graphical representation 108, on to a user graphical representation 106 displayed on user interface 102. For instance, through the user computing device, a user may select the virtual try-on session application to cause the user computing device to execute the application and present, via a display element of the user computing device, the user interface 102. The application may cause one or more peripheral devices of the user computing device to be activated in order to support a virtual try-on session. For instance, the virtual try-on session application may cause the user computing device to activate a camera and lighting element of the user computing device to capture live images of the caller for the virtual try-on session.

In an embodiment, through the user interface 102, the user may be presented with graphical representations of accessories that may be rendered on to the user graphical representation 106 displayed on the user interface 102. The virtual try-on session application may obtain these graphical representations of accessories from the virtual try-on service 104. The virtual try-on service 104 may further provide additional data that may be used to render an accessory graphical representation, such as accessory graphical representation 108, on to one or more features of the user graphical representation 106. For example, the additional data may include metadata that specifies a classification for the accessory (e.g., earring, necklace, tikka, etc.), possible locations for the accessory on a user, actual size information for the accessory, and the like. In an embodiment, the additional data includes an accessory graphical model that may be used by the virtual try-on session application to accurately render an accessory graphical representation on to the user graphical representation 106.

In an embodiment, if the user selects an accessory from the selection pane of the user interface 102, the virtual try-on session application may transmit information regarding this selection, as well as any user position and orientation data, to the virtual try-on service 104 to obtain data that may be used to render the accessory graphical representation 108 on to the user graphical representation 106. The user position and orientation data may be generated by the application, which may utilize machine learning techniques to identify, based on captured images of the user during the virtual try-on session, several body nodes. The machine learning techniques can include one or more of the following, alone or in combination: geometric recognition algorithms, photometric recognition algorithms, principal component analysis using eigenfaces, linear discrimination analysis, elastic bunch graph matching using Fisherface algorithms, hidden Markov modeling, multilinear subspace learning using tensor representation, neuronal motivated dynamic link matching, deep learning using a convolutional neural network, or any other suitable machine learning technique.

In an embodiment, using the user body nodes generated using these machine learning techniques, the application may calculate the distance between these body nodes. For example, the application may calculate the distance between a body node corresponding to an ear of the user to another body node corresponding to an eye of the user. The distances calculated by application may be assumed to be constant such that, as the user changes its orientation or position during the virtual try-on session, for purposes of determining how to render accessory graphical representations, the distances between body nodes remains constant. These distances, in an embodiment, are utilized as references in order to determine the depth of the user and of the various body features of the user. The orientation of the user, as graphically represented in the user interface 102, may be considered in order to normalize the distance between the predicted body nodes when determining the depth of the user and of the user's body features.

In an embodiment, the virtual try-on service 104 obtains, over a live video feed of the virtual try-on session and/or from the virtual try-on session application, a set of images of the user. In response to obtaining this set of images, the virtual try-on service 104 may place an image of the user as the background for a three-dimensional rendering view using a rendering engine or application programming interface (API) (e.g., SceneKit, three.js, etc.). Using the rendering engine or API, the virtual try-on service 104 may cast a ray from each of the body nodes. The distance between these rays may be computed at different depths. These distances may be used to determine the depth of the user from the camera of the user computing device when the distance between the rays is assumed to be constant. In an embodiment, this depth is determined via a binary search until the required distance (within a threshold) is identified.

To determine the user orientation, the virtual try-on service 104 may use the various line segments between the body nodes of the user to calculate a set of angles. For instance, a z-axis angle may be calculated based on the angle between a line segment between the nodes corresponding to the user's eyes and a user image boundary. A y-axis angle may be calculated based on a ratio of lengths of a first line segment generated between a left eye node and a nose-tip node and a second line segment generated between a right eye node and the nose-tip node. Further, an x-axis angle may be calculated based on a ratio of lengths of a first line segment generated between a glabella node and a nose-tip node and a second line segment generated between the nose-tip node and a chin node. In an embodiment, techniques such as perspective-n-point (PnP) can be used to combine the two-dimensional positions of the various body nodes of the user with a generic three-dimensional geometry of a generic body and face to determine the orientation angles.

In an embodiment, the virtual try-on service 104 also generates a set of generic three-dimensional geometries corresponding to a generic user face and body. Using the body nodes, orientation, and depth computed for the actual user, the virtual try-on service 104 may modify the generic three-dimensional geometries. The virtual try-on service 104 may associate these updated three-dimensional geometries with a transparent texture via an alpha layer and nodes are generated from these updated three-dimensional geometries. These new nodes may be referred to as "occlusion nodes," which may be used to determine how particular portions of an accessory graphical representation are rendered on a user graphical representation 106. These occlusion nodes may be added to a three-dimensional rendering view and may be given a higher rendering priority than nodes corresponding to a selected accessory, as described in greater detail below.

In an embodiment, in response to user selection of an accessory via the user interface 102, the virtual try-on service 104 may perform a set of operations to add an alpha channel for an image of the accessory. This alpha channel image may be used to ensure that only the accessory presented in the image is displayed and that the background is transparent when the accessory graphical representation is rendered. The alpha channel image, in an embodiment, is used to create a set of plane render nodes in the three-dimensional rendering system by using the alpha channel image as a texture. It should be noted that if the virtual try-on service 104 maintains a three-dimensional model of the selected accessory, the virtual try-on service 104 may use this three-dimensional model directly as a set of accessory nodes in the three-dimensional rendering system.

In an embodiment, the virtual try-on service 104 refers to an accessory database or other backend repository to obtain a set of real-world physical dimensions of the selected accessory. These physical dimensions may be provided to the virtual try-on session application of the user computing device in response to user selection of an accessory via the user interface 102. This may cause the virtual try-on session application to size the various nodes of the accessory graphical model and to generate a true-to-size accessory graphical representation 108 on to the user graphical representation 106.

In an embodiment, the nodes corresponding to the selected accessory are positioned on the appropriate user body nodes generated by the virtual try-on service 104. For instance, as illustrated in FIG. 1, if the selected accessory is an earring, the nodes corresponding to an accessory graphical model of the earring may be positioned on the user body nodes corresponding to the user's ears. The nodes corresponding to the accessory graphical model may be placed at the same depth as the previously computed depth of the user from the camera of the user computing device. This may ensure that the accessory graphical representation 108 is scaled appropriately on to the user graphical representation 106.

As the user moves during the virtual try-on session, the virtual try-on session application may capture the movement of the user over a series of images collected from the live video feed. The virtual try-on service 104 may evaluate these images to determine that the orientation and position of the user has changed. For example, as illustrated in FIG. 1, the user may tilt their head from their right to their left. Movement data corresponding to the user movement, as represented in the obtained images and presented on the user interface 102 via the user graphical representation 106, may be provided to the virtual try-on service 104. In response to obtaining this movement data, the virtual try-on service 104 may perform the calculations and/or computations described above to identify the position and orientation of the user. Further, based on the updated position and orientation of the user, the virtual try-on service 104 may update the user graphical model and the accessory graphical model to determine placement of the nodes corresponding to the accessory onto the updated user body nodes. This may result in updated accessory graphical model data that may be provided to the virtual try-on session application. In response to obtaining this updated data, the virtual try-on session application may update the user interface 102 to present an updated accessory graphical representation 108 on the user graphical representation 106.

In an embodiment, based on the updated user graphical model and updated accessory graphical model, the virtual try-on service 104 determines the rendering order among the occlusion nodes and the nodes corresponding to the updated accessory graphical model. This may cause user body elements to obscure portions of the accessory graphical representation 108 when the user is in a particular position and orientation. Alternatively, this may cause the accessory graphical representation 108 to obscure portions of the user graphical representation 106. As illustrated in FIG. 1, when the user tilts its head to their right, a graphical representation of a left earring may be partially obscured by the user's left cheek and hair. However, as the user tilts its head to their left, the graphical representation of the left earring may change such that additional features are presented via the user interface 102. Similarly, this change in position and orientation of the user may result in changes to the graphical representation of the right earring, whereby portions of the graphical representation of the right earring may be obscured as a result of the user tilting its head from their right to their left.

In an embodiment, the virtual try-on service 104 applies a physics model to the user graphical model and accessory graphical model to determine how the nodes of the accessory graphical model are to transition in response to detection of user movement via the user interface 102. For instance, in response to obtaining the user movement data from the virtual try-on session application, the virtual try-on service may determine the position and orientation changes of the user, as described above. Based on these position and orientation changes of the user, the virtual try-on service 104 may apply the physics model to the accessory graphical model to determine how the accessory is to move in relation to the detected user movement. For instance, through the physics model, the virtual try-on service 104 may determine how the law of gravity would affect the accessory in response to the user movement. Further, the virtual try-on service 104 may compute the angular acceleration for each of the nodes of the accessory graphical model based on the change in position and orientation of the user. This angular acceleration may be added to the calculated velocity of the accessory to determine the new position for the nodes of the accessory graphical model.

In an embodiment, the virtual try-on service 104 identifies, from the accessory database, metadata corresponding to physical properties of the selected accessory. For instance, the metadata may specify a friction and/or dampening factor of the selected accessory. Further, the metadata may specify which components of the accessory are fixed or unrestrained, which may be used to determine which of the six degrees of freedom may be applicable for determining movement of these components. In an embodiment, based on the accessory metadata, the virtual try-on service 104 determines which components of the selected accessory are permitted to move freely. If only some components of the selected accessory are permitted to move freely, the virtual try-on service 104 may decompose the accessory graphical model into additional nodes to represent these components. The physics model may be applied to these additional nodes corresponding to the components permitted to move freely in response to user movement. These additional nodes may further have different friction/dampening factors compared to the fixed components of the selected accessory. Thus, as the user graphical representation 106 moves within the user interface 102, the accessory graphical representation 108 may also move accordingly, subject to the physics constraints applied via the physics model. This can result in the accessory nodes of the accessory graphical model moving relative to each other as well as relative to the user model, simulating movements (e.g., swinging of an earring attached to a user's ear, etc.) as they would appear when the accessory is worn physically by the user.

It should be noted that the operations described herein as being performed by the virtual try-on service 104 may be performed by the virtual try-on session application itself, using the computing resources of the user computing device. For instance, the virtual try-on session application may maintain, on the user computing device, the user graphical model, the accessory graphical model, the accessory database, the physics model, and all other components that may be required to accurately model and display the accessory graphical representation 108 on to a user graphical representation 106 during the virtual try-on session.

Figure 2:
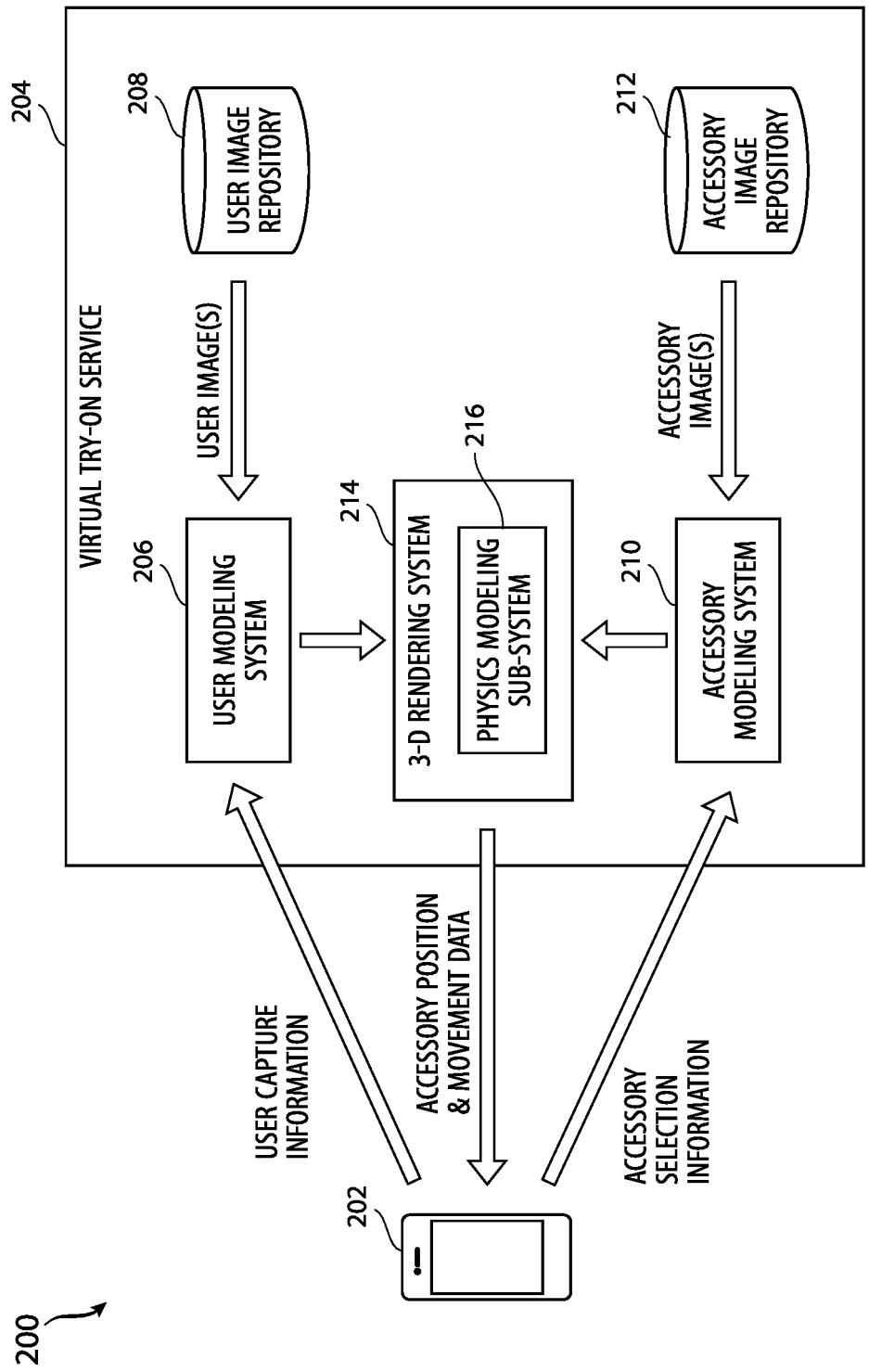
FIG. 2 shows an illustrative example of an environment in which a virtual try-on service utilizes user capture information and accessory selection information to generate accessory position and movement data for presentation of an accessory graphical representation on a user graphical representation in accordance with at least one embodiment.

FIG. 2 shows an illustrative example of an environment 200 in which a virtual try-on service 204 utilizes user capture information and accessory selection information to generate accessory position and movement data for presentation of an accessory graphical representation on a user graphical representation in accordance with at least one embodiment. In the environment 200, a virtual try-on session application executing on a user computing device 202 may transmit user capture information to a user modeling system 206 of the virtual try-on service 204. The user capture information may include a live video feed of the user captured using one or more peripheral devices of the user computing device 202 (e.g., cameras, lighting elements, microphones, etc.). The transmission of user capture information may, thus, be performed over a live streaming session between the user computing device 202 and the virtual try-on service 204.

In response to obtaining the user capture information, the user modeling system 206 may determine whether other existing images of the user and/or user graphical models are available. For instance, the user modeling system 206 may obtain, from a user image repository 208, any available user images that have been previously processed to generate or update a user graphical model. From the user image repository 208, the user modeling system 206 may also obtain an existing user graphical model, which may be used by a 3-D rendering system 214 to determine placement of an accessory graphical representation on to a user graphical representation presented on the user computing device 202. These existing images and models may be used as references for determining any changes to the position and orientation of the user during the virtual try-on session.

If a user graphical model is not available for the user, the user modeling system 206 may generate a new user graphical model using the capture information obtained from the user computing device 202 and any available user images from the user image repository 208. For instance, using the captured images of the user and/or the images obtained from the user image repository 208, the user modeling system 206 may generate a set of user body nodes corresponding to various facial and body features of the user. Further, the user modeling system 206 may calculate the size and depth of the various facial and body features of the user. As noted above, the image of the user may be placed as the background for a 3-D rendering view and rays may be cast from each of the reference body nodes, from which the distance between these rays is computed at different depths. This may be performed by the user modeling system 206 in order to determine the depth of the user from the camera of the user computing device 202.

In an embodiment, the user modeling system 206 uses the user capture information to determine the orientation and position of the user relative to the position/orientation of the camera of the user computing device 202. Based on the user capture information and using the user graphical model, the user modeling system 206 may compute the x, y, and z-angles corresponding to the user's orientation and position. The user modeling system 206 may update the user graphical model based on these computed angles such that any accessory graphical representations may be updated in accordance with the change in orientation and position of the user.

In an embodiment, the user modeling system 206 generates a set of occlusion nodes for the user graphical model, which may be used to hide portions of the accessory graphical representation based on the position and orientation of the user. To generate the occlusion nodes, the user modeling system 206 may create generic three-dimensional geometries of a generic user (e.g., face, body, etc.). In response to obtaining the user capture information and/or existing user images from the user image repository 208, the user modeling system 206 may modify these three-dimensional geometries based on the computed orientation and depth of the user. The updated three-dimensional geometries are subsequently associated with a transparent texture via an alpha layer and the occlusion nodes are generated from this texture. The user modeling system 206 may provide, to a 3-D rendering system 214 of the virtual try-on service 204, the user graphical model and the set of occlusion nodes generated based on the updated three-dimensional geometries.

The virtual try-on session application, via the user computing device 202, may also provide accessory selection information to an accessory modeling system 210 of the virtual try-on service 204 to determine how an accessory graphical representation is to be presented on the user graphical representation. The accessory selection information may include an identifier corresponding to the selected accessory, as well as other information that may be used to determine where, on a user body, the accessory is to be applied. In response to obtaining the accessory selection information, the accessory modeling system 210 may obtain, from an accessory image repository 212, one or more two-dimensional images of the accessory.

In an embodiment, the accessory modeling system 210 performs a set of operations to generate, using the two-dimensional images of the accessory, an alpha channel image of the accessory that may be used to ensure that only the accessory in the image is displayed and the background of the image is transparent when rendered. This alpha channel image may be used to create one or more plane render nodes in the 3-D rendering system 214 by using the alpha channel image as a texture. In an embodiment, the accessory modeling system 210 obtains, from an accessory database or other repository, the actual dimensions of the accessory. These dimensions may be provided to the 3-D rendering system 214, which may provide these dimensions to the virtual try-on session application for use in determining placement and scaling of the accessory graphical representation relative to the user graphical representation. In an embodiment, if a three-dimensional graphical model of the accessory is available, the accessory modeling system 210 may provide this three-dimensional model to the 3-D rendering system 214.

In an embodiment, the 3-D rendering system 214 of the virtual try-on service 204 uses the user graphical model and the occlusion nodes provided by the user modeling system 206, as well as the accessory graphical model provided by the accessory modeling system 210, to determine a set of positions for the nodes of the accessory graphical model. These positions may be used to determine how to graphically represent the selected accessory onto the graphical representation of the user presented on the user interface of the user computing device 202. For instance, the nodes corresponding to the accessory graphical model are placed on the corresponding user body nodes of the user graphical model. For example, if the accessory graphical model is a representation of an earring, the nodes of the accessory graphical model may be placed on to user body nodes corresponding to the user's ears. The nodes of the accessory graphical model may be placed at the same depth as the previously computed user depth identified by the user modeling system 206. Further, the accessory graphical model may be scaled by the 3-D rendering system 214 based on the depth of the user, as determined by the user modeling system 206.

In an embodiment, the 3-D rendering system 214 further places the nodes of the accessory graphical model at the appropriate angle based on the determined orientation of the user, as determined by the user modeling system 206. This ensures that the angle of the accessory, as presented in the user interface, is constant with respect to the orientation of the user. Further, as the user's orientation changes and is determined by the user modeling system 206, the nodes of the accessory graphical model may be positioned with respect to the user's change in orientation.

The 3-D rendering system 214 may further prioritize the occlusion nodes provided by the user modeling system 206 over the nodes of the accessory graphical model. This may ensure that wherever an occlusion node and an accessory graphical model node overlap, the portion of the accessory graphical representation corresponding to the accessory graphical mode node is hidden from view on the user interface. As the user's orientation changes, the 3-D rendering system 214 may change the render ordering of the occlusion node and the overlapping accessory graphical model node. For example, as illustrated in FIG. 1, as the user rotates its face to the right, the graphical representation of the left earring is displayed and unobscured by the user's facial features (e.g., the node corresponding to the left earring is given a higher render priority). Alternatively, as the user rotates its face to the left, the graphical representation of the left earring is obscured by one or more facial features of the user (e.g., the occlusion node is given a higher render priority). Thus, the occlusion nodes may obscure the corresponding accessory graphical nodes based on their relative render priority order, as well as their relative depth.

In an embodiment, the 3-D rendering system 214 includes a physics modeling sub-system 216 that may be used to determine how to model the movement of the accessory graphical representation in response to detection of a user's movement during the virtual try-on session. For instance, in response to detecting a change in the position and orientation of the user, the physics modeling sub-system 216 may apply gravitational effects to the accessory graphical nodes corresponding to elements of the accessory that are able to move freely. Additionally, based on the change in orientation, the physics modeling sub-system 216 may calculate the angular acceleration for these accessory graphical model nodes, which is added to the calculated velocity of these nodes. The results of these calculations are used to determine the new position of the accessory graphical model nodes. In an embodiment, a gravitational factor is fine-tuned based on the 3-D rendering system 214 view and the rendering capabilities of the user computing device 202 (e.g., frames per second that can be presented via the user interface, etc.). The gravitational effect may be considered independently for each axis of rotation (e.g., x, y, and z axes).

In an embodiment, for accessories comprising a set of elements that are fixed and other elements that are permitted to move and/or rotate freely, the 3-D rendering system 214 can decompose the accessory graphical model to generate additional nodes that may be used to represent each of these components. The physics modeling sub-system 216 may apply the physics model (e.g., application of the gravitational factors, calculation of velocity and angular acceleration, etc.) to the accessory graphical nodes corresponding to the elements of the selected accessory that are allowed to move and/or rotate. Further, the physics modeling sub-system 216 may apply different friction/dampening factors to each of the accessory graphical model nodes based on their identified range of motion.

The 3-D rendering system 214 may provide, to the virtual try-on session application of the user computing device 202, accessory position and movement data generated using the updated accessory graphical model to cause the virtual try-on session application to render the accessory graphical representation on to the user graphical representation in accordance with the updated accessory graphical model. Thus, as the user moves during the virtual try-on session, the virtual try-on session application may obtain this data from the 3-D rendering system 214 and graphically represent the accessory on to the user graphical representation accurately (e.g., changing scale, simulating movement, hiding or presenting elements of the accessory, etc.).

It should be noted that some or all of the components of the virtual try-on service 204 configured to generate and update the user graphical model and accessory graphical model in order to allow for an accurate accessory graphical representation as the user moves during the virtual try-on session may be implemented by the virtual try-on session application and executed using hardware and software of the user computing device 202. Thus, rather than transmitting user capture information and accessory selection information to the virtual try-on service 204, the virtual try-on session application may use this data as input to one or more processes to determine how to render the accessory graphical representation on to the user graphical representation presented via the user interface of the user computing device 202.

Figure 3:
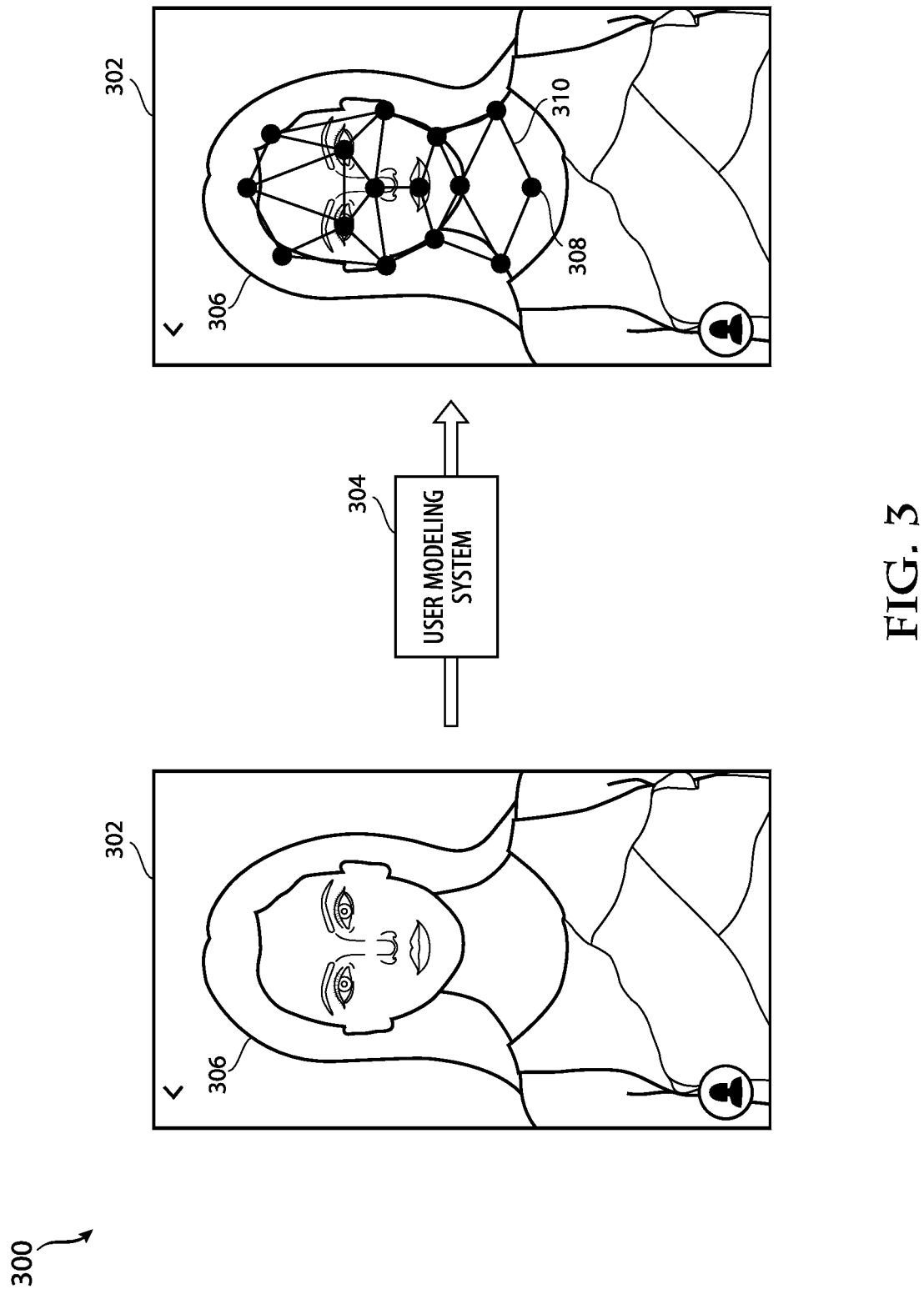
FIG. 3 shows an illustrative example of an environment in which a user modeling system generates a user graphical model comprising a set of nodes and connectors in accordance with at least one embodiment.

FIG. 3 shows an illustrative example of an environment 300 in which a user modeling system 304 generates a user graphical model comprising a set of nodes 308 and connectors 310 in accordance with at least one embodiment. As noted above, the user modeling system 304 may generate a set of user body nodes 308 corresponding to various facial and body features of the user based on a user graphical representation 306 presented on a user interface 302 and/or other images captured of the user. The user modeling system 304 may calculate, using these body nodes 308 the size and depth of the various facial and body features of the user. The user graphical representation 306 may be placed as the background for a 3-D rendering view and rays may be cast from each of the reference body nodes 308, from which the distance between these rays is computed at different depths. This may be performed by the user modeling system 304 in order to determine the depth of the user as represented in the user interface 302.

Using the body nodes 308, the user modeling system 304 may generate a set of connectors 310 to connect the various body nodes 308. These connectors 310 may be used by the user modeling system 304 to determine the orientation of the user. For instance, the ratio of the length of a connector 310 that connects a user's left eye body node to a nose-tip body node to the length of another connector 310 that connects user's right eye body node to the nose-tip body node may be used to determine, or otherwise estimate, a y-axis angle for the user's orientation. Similarly, the z-axis angle for the user's orientation may be calculated based on an angle of the image boundary and the connector 310 between the body nodes corresponding to the user's eyes. The x-axis angle may be calculated based on the ratio of the length of a connector 310 between a glabella body node and the nose-tip node and the length of another connector 310 between the nose-tip body node and a chin body node.

Additionally, the length of these connectors 310 is assumed to be constant within the user graphical model. This property of the connectors 310 may be used as a reference to estimate the depth of the user during the virtual try-on session. Further, the orientation of the user may also be used to normalize the distance between the body nodes 308 when determining the depth of the user during the virtual try-on session.

As noted above, the user modeling system 304 can also use the nodes 308 and connectors 310 in conjunction with generic three-dimensional geometries of a generic user to generate a set of occlusion nodes. For instance, the position of the nodes 308 and connectors 310 may be used to modify the generic three-dimensional geometries, which are then associated with a texture. The texture may be transparent via an alpha channel layer. From this texture, the user modeling system 304 may generate the occlusion nodes.

Figure 4:
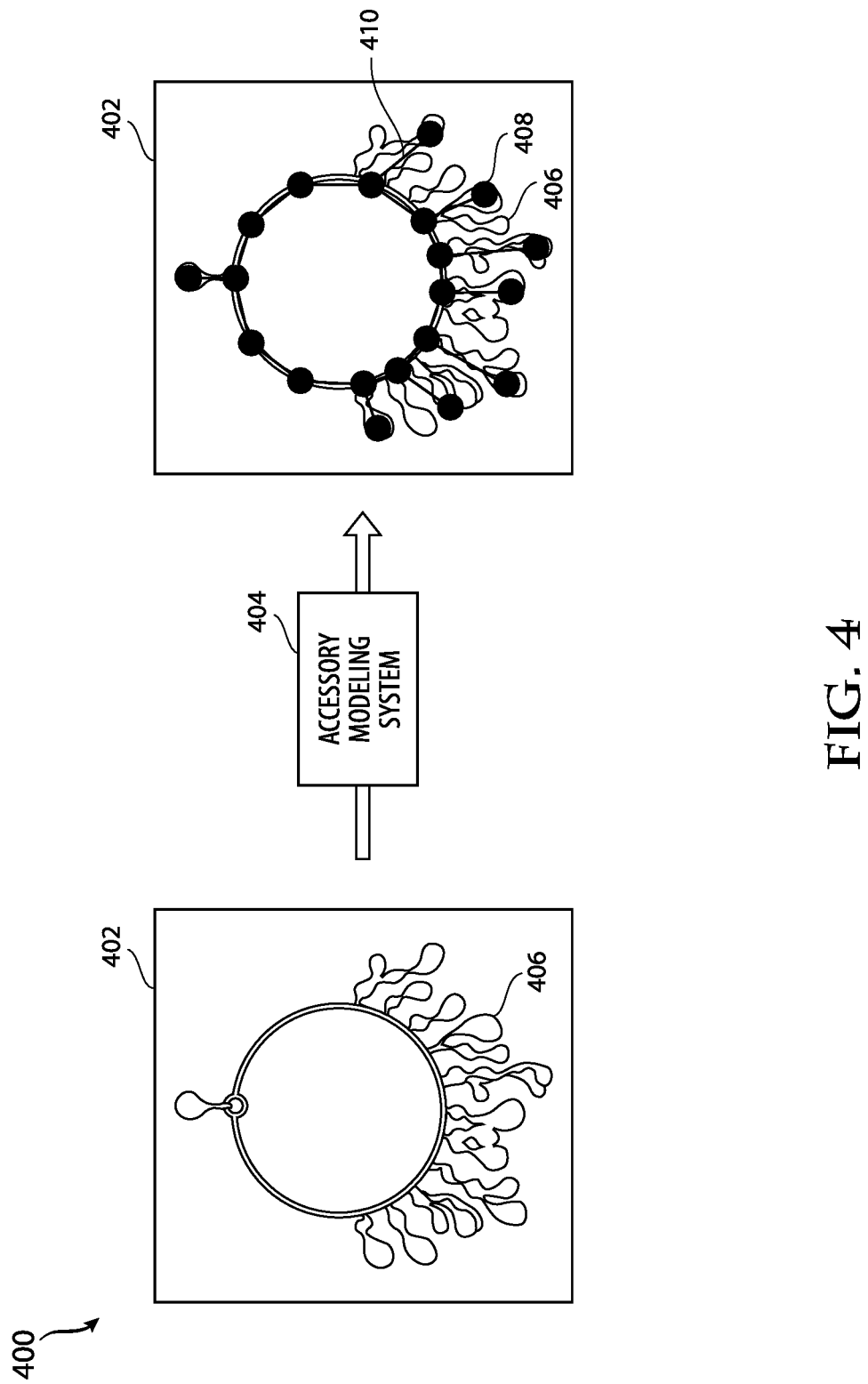
FIG. 4 shows an illustrative example of an environment in which an accessory modeling system generates an accessory graphical model comprising a set of nodes and connectors in accordance with at least one embodiment.

FIG. 4 shows an illustrative example of an environment 400 in which an accessory modeling system 404 generates an accessory graphical model 406 comprising a set of nodes 408 and connectors 410 in accordance with at least one embodiment. As noted above, the accessory modeling system 404 performs a set of operations to generate, using the two-dimensional images 402 of an accessory 406, an alpha channel image of the accessory that may be used to ensure that only the accessory in the image is displayed and the background of the image is transparent when rendered. This alpha channel image may be used to create one or more plane render nodes 408 in the 3-D rendering system by using the alpha channel image as a texture. In an embodiment, the accessory modeling system 404 obtains, from an accessory database or other repository, the actual dimensions of the accessory. These dimensions may be provided to the virtual try-on session application for use in determining placement and scaling of the accessory graphical representation 406 relative to the user graphical representation.

In an embodiment, the plane render nodes 408 are generated to represent different elements of the accessory 406. For instance, the accessory graphical model may comprise a set of nodes corresponding to elements of the accessory 406 that may move and/or rotate freely in response to user movement. Additionally, the accessory graphical model may include another set of nodes corresponding to fixed elements of the accessory 406. Connectors 410 among these sets of nodes 408 may be used to determine, using a physics model, how the various elements of the accessory may move and/or rotate in response to changes to the orientation and position of the user during the virtual try-on session. The movement and/or rotation of these nodes may be determined using the physics model described above.

In an embodiment, as the user orientation and position changes during the virtual try-on session, the nodes 408 of the accessory graphical model may be positioned based on these changes. For instance, based on the position and orientation of the user, the nodes 408 corresponding to the accessory 406 may be placed at an angle such that the angle of the accessory with respect to the user remains constant. Further, the nodes 408 may be placed at the same depth as the user depth, as determined via evaluation of the user position and orientation using the user graphical model. Additionally, the rendering of the accessory graphical representation may depend on the rendering order of the nodes 408 and the occlusion nodes generated by the user modeling system. This ensures that whenever an occlusion node and a node 408 overlap, the portion of the accessory 406 corresponding to the node 408 is hidden.

Figure 5:
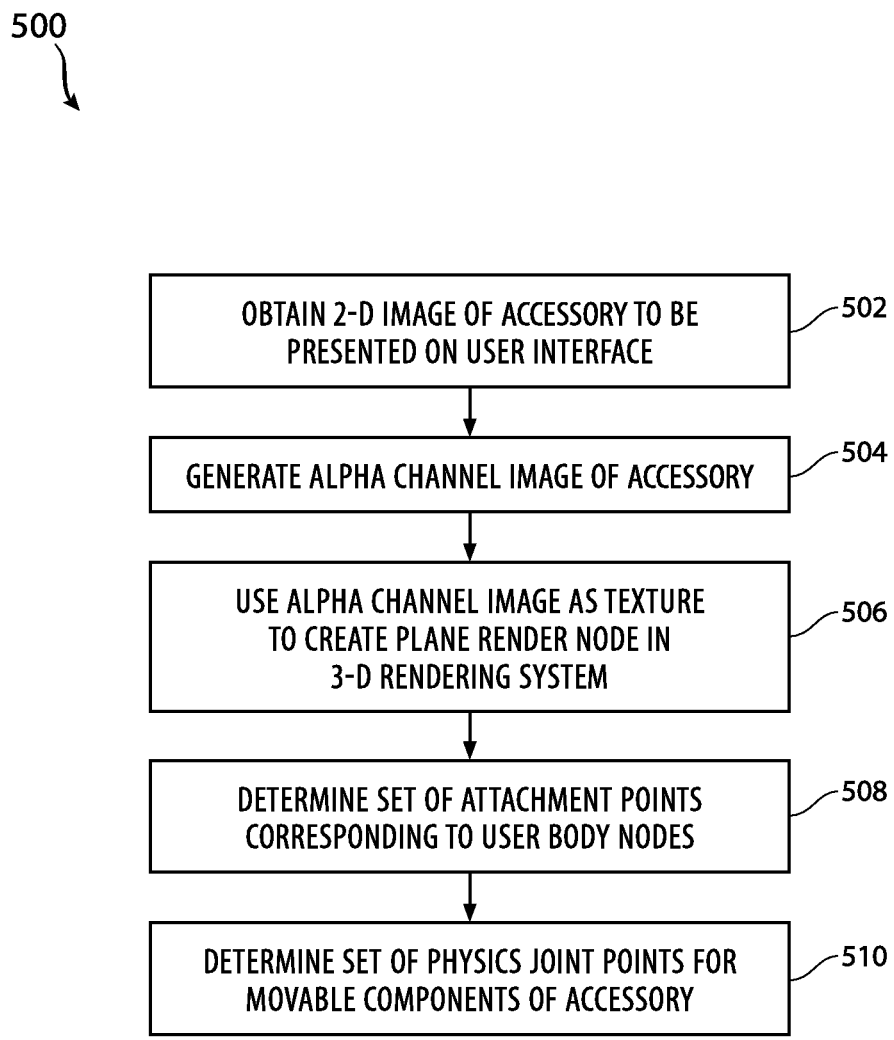
FIG. 5 shows an illustrative example of a process for converting a two-dimensional image of an accessory to be graphically represented on a user interface into one or more plane render nodes in a three-dimensional rendering system in accordance with at least one embodiment.

FIG. 5 shows an illustrative example of a process 500 for converting a two-dimensional image of an accessory to be graphically represented on a user interface into one or more plane render nodes in a three-dimensional rendering system in accordance with at least one embodiment. The process 500 may be performed by an accessory modeling system, which may be implemented by virtual try-on service or on the user computing device via the virtual try-on session application. When a user, via a user interface of its user computing device, selects an accessory to be graphically represented on to a user graphical representation, the virtual try-on session may identify the accessory to be presented. Information regarding this accessory may be provided to the accessory modeling system to generate an accessory graphical model of the accessory, which can be used to determine the possible physical movements of the accessory when worn by the user.

In an embodiment, in response to a user selection of an accessory, the accessory modeling system obtains 502 a two-dimensional image of the accessory that is to be graphically represented on to the user graphical representation presented on the user interface. The accessory modeling system may query, using the accessory information provided by the virtual try-on session application, an accessory image repository to obtain one or more two-dimensional images of the selected accessory. Using these two-dimensional images, the accessory modeling system may perform one or more operations to generate 504 an alpha channel image of the selected accessory. This alpha channel image may be generated to ensure that only the accessory represented in the obtained images is displayed and the background is transparent when the accessory graphical representation is rendered.

The accessory modeling system may use 506 the alpha channel image as a texture to create one or more plane render nodes in a 3-D rendering system. These one or more plane render nodes may be used to position the accessory graphical representation in response to user movement and changes in position and orientation. The one or more plane render nodes may, thus, serve as an accessory graphical model that can be used in conjunction with a user graphical model to accurately render the accessory graphical representation on to the user graphical representation.

In an embodiment, the accessory modeling system determines 508, using the one or more plane render nodes, a set of attachment points corresponding to user body nodes of the user graphical model where the accessory would physically attach to the user body (e.g., an earring on to a user's ear, etc.). For instance, the accessory modeling system may associate a plane render node corresponding to the accessory attachment point to a user body node corresponding to the point where the accessory would physically be attached. Additionally, the accessory modeling system may determine 510 the physics joint points (e.g., the points at which components of the accessory are allowed to move with respect to each other), as well as the friction and/or dampening factors for each of these physics joint points. For instance, for an accessory comprising one or more movable components (e.g., tassels, chandeliers, etc.), the accessory modeling system may identify the physics joint points that define the attachment point between these movable components and the fixed components of the accessory. The accessory modeling system may associate the friction and/or dampening factors to these particular points (e.g., nodes), which may be used in applying a physics model to the set of accessory nodes as described in greater detail below.

Figure 6:
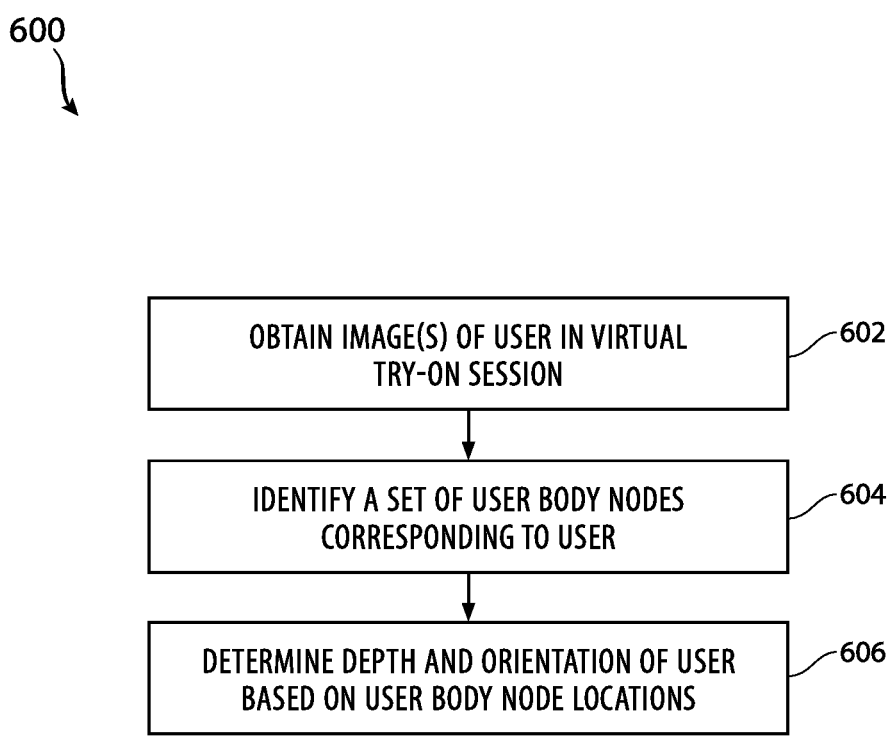
FIG. 6 shows an illustrative example of a process for using one or more images of a user captured during a virtual try-on session to determine the depth and orientation of the user for graphically representing accessories on to a graphical representation of the user in accordance with at least one embodiment.

FIG. 6 shows an illustrative example of a process 600 for using one or more images of a user captured during a virtual try-on session to determine the depth and orientation of the user for graphically representing accessories on to a graphical representation of the user in accordance with at least one embodiment. The process 600 may be performed by a user modeling system, which may be implemented by the virtual try-on service or on the user computing device via the virtual try-on session application. During the virtual try-on session, or prior to initiating the virtual try-on session, the user modeling system may obtain 602 one or more images of the user. As noted above, to initiate the virtual try-on session, the virtual try-on session application may initiate one or more peripheral devices of the user computing device (e.g., cameras, microphones, lighting elements, etc.). Using these one or more peripheral devices, the virtual try-on session application may capture one or more images of the user, which may be provided to the user modeling system. Alternatively, during the virtual try-on session and from a live video feed, the user modeling system may obtain 602 the user images of the user.

In an embodiment, the user modeling system identifies 604 a set of user body nodes corresponding to the user. For instance, the user modeling system may use one or more machine learning techniques, as described above, to detect, or otherwise predict, one or more body nodes corresponding to the facial and body features of the user. Using these newly identified nodes, the user modeling system may determine 606 the depth and orientation of the user. For instance, the user modeling system may calculate the distance between sets of body nodes, which may be assumed to be constant. The distances calculated by the user modeling system may be used as references to determine the depth of the various facial and body features of the user. In some instances, the user modeling system places as the background for a 3-D rendering view and casts rays from each of the identified body nodes. The distance between these rays is calculated at different depths in order to determine the depth of the user from the camera. To determine the orientation of the user based on the user body node locations, the user modeling system may use the line segments between the body nodes of the user to calculate a set of angles, as described above.

Figure 7:
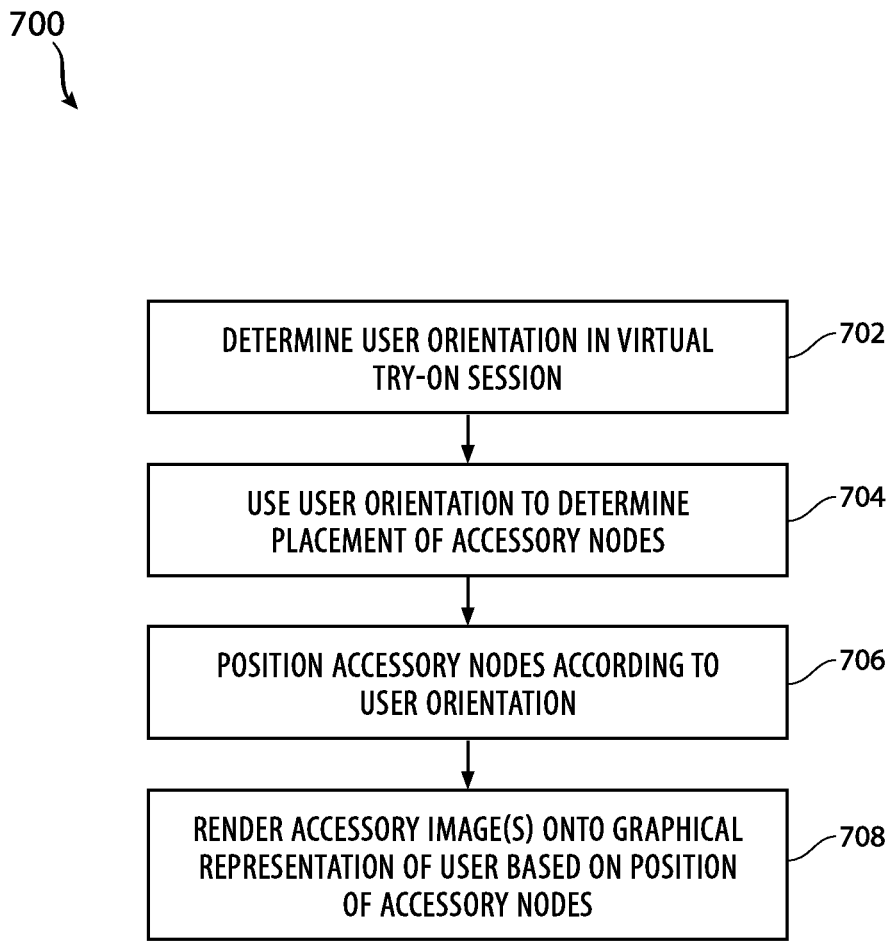
FIG. 7 shows an illustrative example of a process for rendering accessory graphical representations on to a user graphical representation based on the orientation of the user during the virtual try-on session in accordance with at least one embodiment.

FIG. 7 shows an illustrative example of a process 700 for rendering accessory graphical representations on to a user graphical representation based on the orientation of the user during the virtual try-on session in accordance with at least one embodiment. The process 700 may be performed by a 3-D rendering system implemented by a virtual try-on service or by the virtual try-on session application using computing resources of the user computing device. During a virtual try-on session, the user may change their orientation in order to determine how an accessory would look from different directions and angles. As such, the user graphical representation presented on the user interface may also change in accordance with the user's change in orientation and movement. From the video feed of the user, the 3-D rendering system may determine 702 the user orientation. This operation may performed in conjunction with the user modeling system described above, which may use the various line segments generated using the user body nodes to determine the x, y, and z-axis angles defining the orientation of the user.

Using these orientation angles, the 3-D rendering system may determine 704 placement of the accessory nodes of the accessory graphical model and position 706 these accessory nodes according to the user orientation. For instance, the accessory nodes may be positioned at an angle with respect to the orientation of the user such that the angle of the accessory graphical model with respect to the user graphical model remains constant. This may ensure that the accessory nodes move with respect to the user's orientation as the user's orientation changes over time. Based on the new position of the accessory nodes, the 3-D rendering system may render 708 accessory images (e.g., an accessory graphical representation) onto the user graphical representation to show how the accessory would look on the user and how the look would change when the user changes their orientation and/or position. In an embodiment, the 3-D rendering system also takes into account the attachment points (e.g., nodes) in the accessory graphical model in determining the position of the accessory nodes according to the user orientation.

Figure 8:
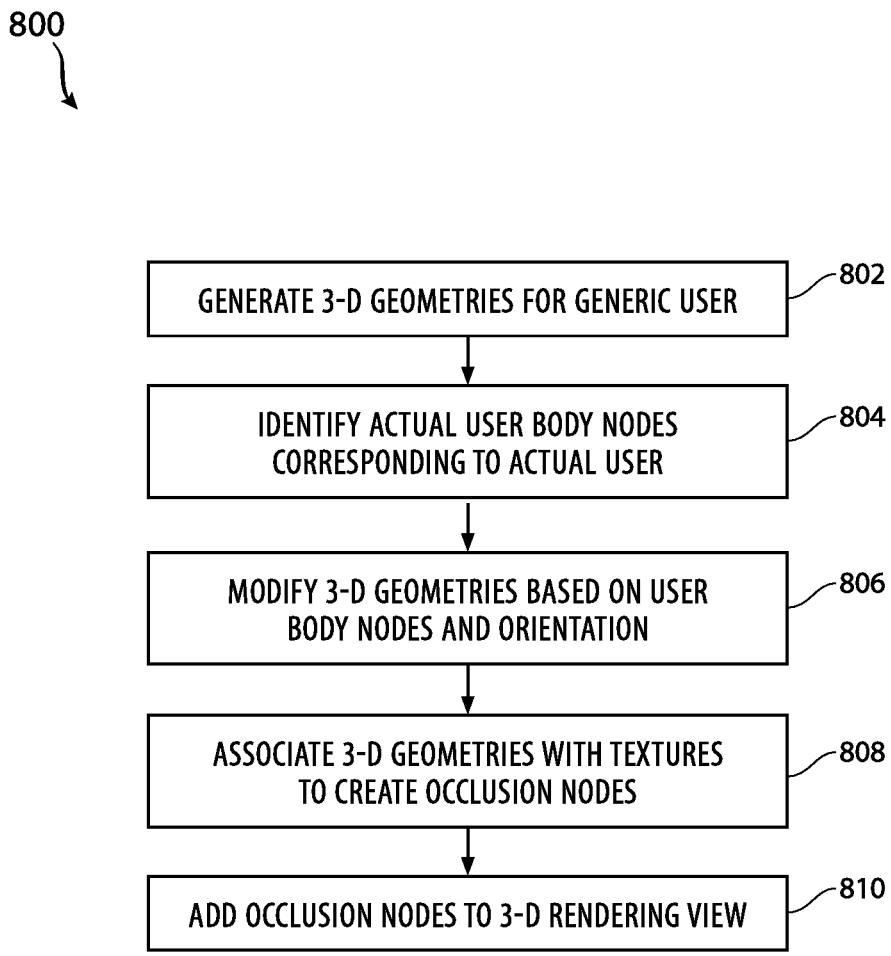
FIG. 8 shows an illustrative example of a process for generating occlusion nodes based on generic user three-dimensional geometries and actual user body nodes and orientation in accordance with at least one embodiment.

FIG. 8 shows an illustrative example of a process 800 for generating occlusion nodes based on generic user three-dimensional geometries and actual user body nodes and orientation in accordance with at least one embodiment. The process 800 may be performed by may be performed by a user modeling system, which may be implemented by the virtual try-on service or on the user computing device via the virtual try-on session application. As part of the virtual try-on session, the user modeling system may generate 802 three-dimensional geometries for a generic user. These three-dimensional geometries may correspond to a generic user face, body, and other features.

As noted above, the user modeling system may generate a user graphical model based on the two-dimensional images of the user obtained either during the virtual try-on session or just prior to the virtual try-on session, whereby the user may be prompted to provide one or more user images. From the user graphical model, the user modeling system may identify 804 the actual user body nodes corresponding to the user. Further, the user modeling system may modify 806 the three-dimensional geometries based on the position of the user body nodes, as well as the depth and the orientation of the user.

The user modeling system may associate 808 the updated three-dimensional geometries with a transparent texture, via an alpha channel layer in order to generate a set of occlusion nodes. These occlusion nodes are added 810 to the 3-D rendering view of the user graphical model and accessory graphical model. The occlusion nodes may be given a higher render priority than existing accessory nodes of the accessory graphical model. This may ensure that wherever an occlusion node and an accessory node overlap, the portion of the accessory graphical representation corresponding to this accessory node is hidden from view through the user interface.

Figure 9:
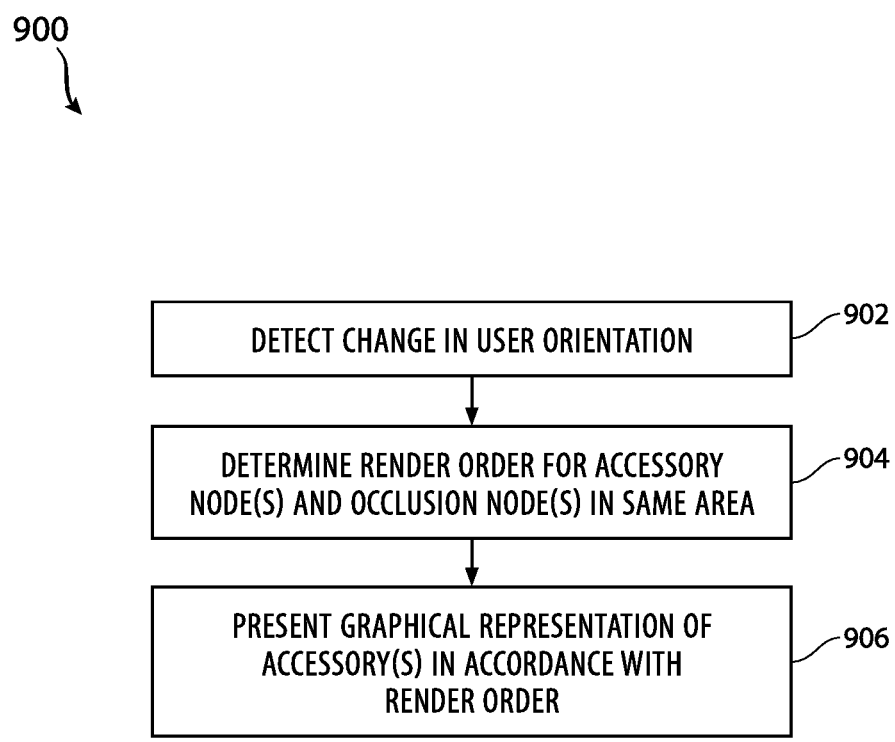
FIG. 9 shows an illustrative example of a process for presenting accessory graphical representations in accordance with a render order based on changes to user orientation in accordance with at least one embodiment.

FIG. 9 shows an illustrative example of a process 900 for presenting accessory graphical representations in accordance with a render order based on changes to user orientation in accordance with at least one embodiment. The process 900 may be performed by a 3-D rendering system implemented on either the virtual try-on service or on a virtual try-on session application that may leverage computing resources of the user computing device. Operations of the process 900 may also be performed in conjunction with the user modeling system. During the virtual try-on session, as the user changes its position and orientation, the 3-D rendering system may detect 902 this change in the user's position and/or orientation. For instance, via the user modeling system, the 3-D rendering system may determine whether the position of any user body nodes has changed. If so, the 3-D rendering system may determine that a change in the user's position and/or orientation has occurred.

In response to the change in the user's orientation and/or position, the 3-D rendering system determines 904 the render order for the accessory nodes and occlusion nodes. For instance, as illustrated in FIG. 1, if the user rotates their face to the right, the accessory nodes corresponding to the left earring may be assigned a higher render order than the occlusion nodes corresponding to the facial features of the user that overlap the accessory nodes. Alternatively, if the user rotates their face to the left, the occlusion nodes may be assigned a higher render order than the accessory nodes. Thus, based on this updated render order, the 3-D rendering system may determine which elements of either the user graphical representation or accessory graphical representation are to be obscured when displayed on the user interface. Thus, the 3-D rendering system may present 906 the accessory graphical representation on to the user graphical representation in accordance with this updated render order. The occlusion nodes may obscure the appropriate accessory graphical nodes based on their relative render priority order as well as their relative depth.

Figure 10:
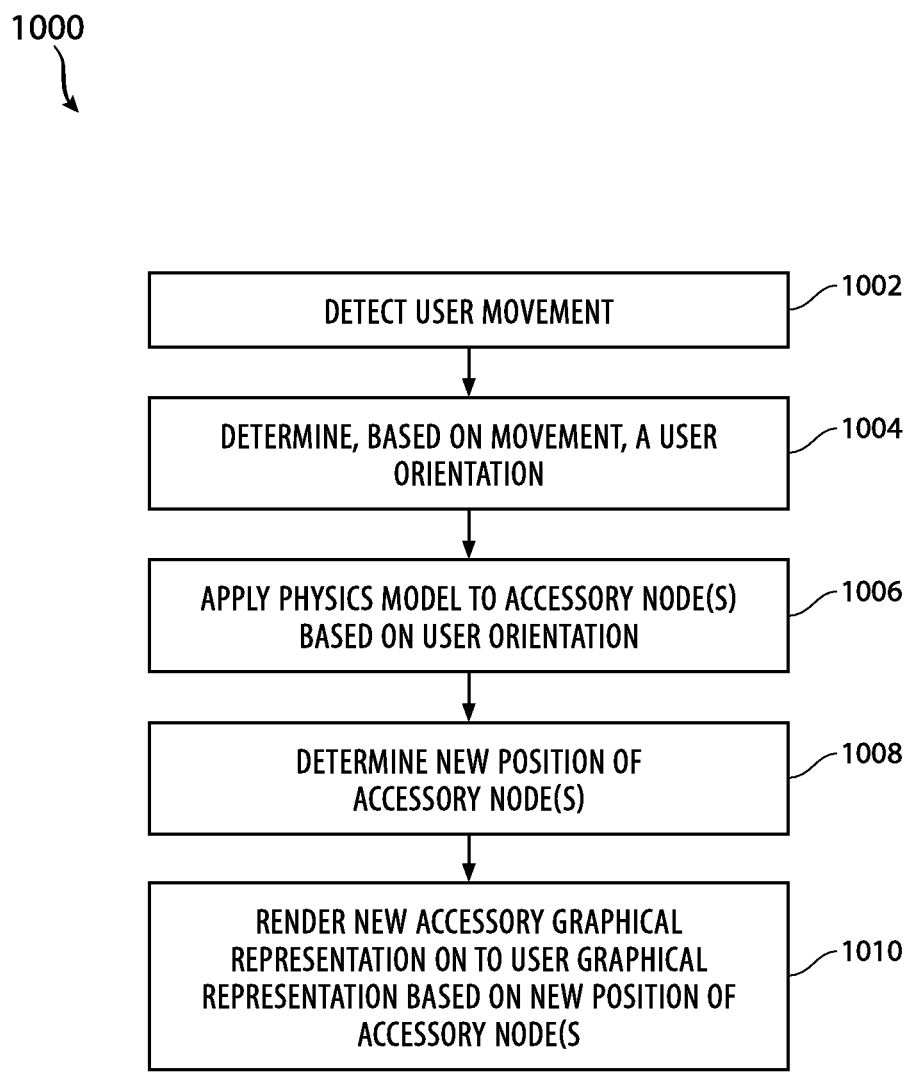
FIG. 10 shows an illustrative example of a process for applying a physics model to a set of accessory nodes corresponding to a selected accessory in order to render the accessory graphical representation on to the user graphical representation in accordance with the user movement in accordance with at least one embodiment.

FIG. 10 shows an illustrative example of a process 1000 for applying a physics model to a set of accessory nodes corresponding to a selected accessory in order to render the accessory graphical representation on to the user graphical representation in accordance with the user movement in accordance with at least one embodiment. The process 1000 may be performed by the 3-D rendering system, which may implement a physics model via a physics modeling subsystem to determine how to render accessory graphical representations in response to user movements. In the process 1000, the 3-D rendering system may detect 1002 user movement via a live video feed of the user during the virtual try-on session or otherwise through evaluation of captured user images generated during the virtual try-on session. The user movement may be detected via evaluation of the orientation angles of the updated user images in comparison to previously calculated orientation angles for the user by the user modeling system, as described above. Thus, based on this movement, the 3-D rendering system may determine 1004 a new user orientation.

Based on this new user orientation, the 3-D rendering system may apply a physics model to the accessory nodes corresponding to the user-selected accessory to determine 1008 a new position for each of these accessory nodes. For instance, the 3-D rendering system may apply gravitational effects to the accessory nodes corresponding to elements of the accessory that are able to move freely. Additionally, based on the change in orientation, the 3-D rendering system may calculate the angular acceleration for these accessory nodes, which is added to the calculated velocity of these nodes. The results of these calculations are used to determine 1008 the new position of the accessory nodes. A gravitational factor can be fine-tuned based on the 3-D rendering system view and the rendering capabilities of the user computing device. Further, the gravitational effect may be considered independently for each axis of rotation.

Based on the new position of the accessory nodes, the 3-D rendering system may render 1010 the new accessory graphical representation on to the user graphical representation. This ensures that the accessory, as graphically represented on the user interface, appears to move according to the user's movements. Thus, the user may be provided with a more natural view of the accessory as it would appear on the user during the virtual try-on session.

Figure 11:
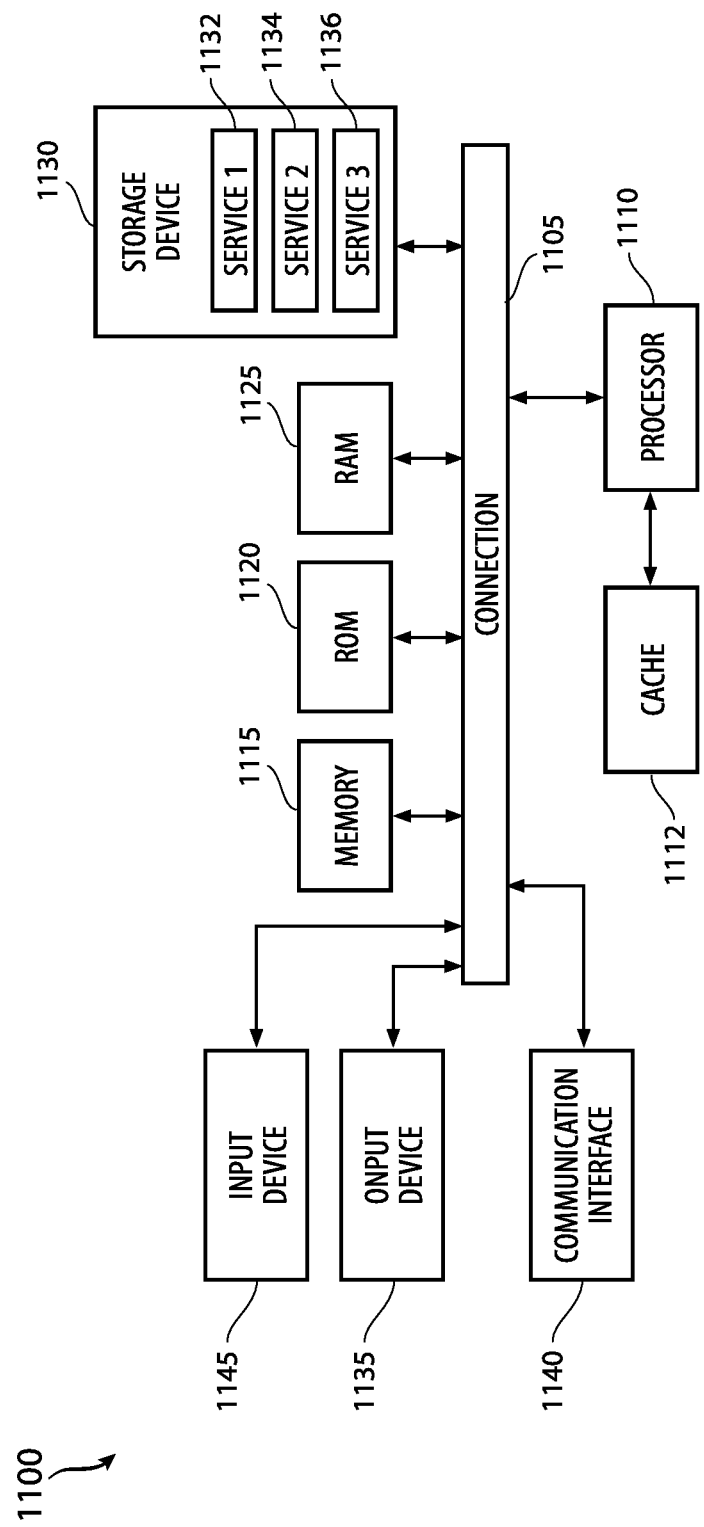
FIG. 11 shows an illustrative example of a computing system architecture including various components in electrical communication with each other using a connection in accordance with various embodiments.

FIG. 11 shows an illustrative example of a computing system architecture including various components in electrical communication with each other using a connection in accordance with various embodiments. In this example, FIG. 11 illustrates a computing system 1100 (system 1100) including components in electrical communication with each other using a connection 1105, such as a bus. System 1100 includes a processing unit (CPU or processor) 1110 and a system connection 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware or software service, such as service 1 1132, service 2 1134, and service 3 1136 stored in storage device 1130, configured to control the processor 1110 as well as a special-purpose processor where software instructions are incorporated into the actual processor design. The processor 1110 may be a completely self-contained computing system, containing multiple cores or processors, a bus, memory controller, cache, etc. A multi-core processor may be symmetric or asymmetric.

To enable user interaction with the device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include services 1132, 1134, 1136 for controlling the processor 1110. Other hardware or software modules are contemplated. The storage device 1130 can be connected to the system connection 1105. In one aspect, a hardware module that performs a particular function can include the software component stored in a computer-readable medium in connection with the necessary hardware components, such as the processor 1110, connection 1105, output device 1135, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se. In one example, using a protocol such as Bluetooth, the two devices may communicate directly with each other to manage the try-on session.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, smart mirrors, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method, comprising:
   generating, based on one or more images of a user, an initial user three-dimensional model;
   obtaining, via a user interface, a request to graphically represent an accessory on a user graphical representation, the user graphical representation generated using the initial user three-dimensional model;
   obtaining, in response to the request, an initial accessory three-dimensional model by:
      obtaining a two-dimensional image of the accessory;
      generating, using the two-dimensional image of the accessory, an alpha channel image of the accessory; and
      using the alpha channel image and a set of dimensions of the accessory to generate the initial accessory three-dimensional model;
   positioning, via the user interface and based on a first set of parameters of the initial user three-dimensional model and a second set of parameters of the initial accessory three-dimensional model, an accessory graphical representation on to the user graphical representation;
   detecting user movement;
   updating the initial user three-dimensional model and the initial accessory three-dimensional model in response to the user movement to yield an updated user three-dimensional model and an updated accessory three-dimensional model; and
   presenting, on a display device, via the user interface and based on the updated accessory three-dimensional model and the updated user three-dimensional model, the accessory graphical representation on the user graphical representation in accordance with the user movement.

2. The method of claim 1, wherein generating the initial user three-dimensional model comprises:
   detecting, from the one or more images of the user, a set of reference points; and
   using the set of reference points to determine size and depth of user features.

3. The method of claim 1, wherein the initial accessory three-dimensional model comprises a set of attachment nodes corresponding to components attachable to the user and a set of joint nodes corresponding to movable components of the accessory.

4. The method of claim 1, further comprising:
   evaluating the initial user three-dimensional model to determine a user orientation;
   using the user orientation to determine an accessory orientation; and
   positioning the accessory graphical representation on to the user graphical representation in accordance with the accessory orientation.

5. The method of claim 1, further comprising:
   generating, based on the initial user three-dimensional model, a set of occlusion nodes;
   detecting an overlap between at least one of the set of occlusion nodes and at least one node of the initial accessory three-dimensional model; and
   hiding, via the user interface, a portion of the accessory graphical representation corresponding to the at least one node of the initial accessory three-dimensional model.

6. The method of claim 1, further comprising:
   determining, in response to detecting the user movement, a change in user orientation;
   applying a physics model to the initial accessory three-dimensional model to update the initial accessory three-dimensional model in accordance with the change in the user orientation; and
   updating the user interface to present accessory movement with the user movement.

7. A system, comprising:
   one or more processors; and
   memory including instructions that, as a result of being executed by the one or more processors, cause the system to:
      obtain a request to graphically represent an accessory on a user graphical representation of a user, the user graphical representation generated using an initial user three-dimensional model;
      obtain, in response to the request, an initial accessory three-dimensional model by:
         obtaining a two-dimensional image of the accessory;
         generating, using the two-dimensional image of the accessory, an alpha channel image of the accessory; and using the alpha channel image and a set of dimensions of the accessory to generate the initial accessory three-dimensional model;

position, based on an orientation of the initial user three-dimensional model and using the initial accessory three-dimensional model, an accessory graphical representation on to the user graphical representation displayed via a user interface;

detect user movement;

update the initial user three-dimensional model and the initial accessory three-dimensional model in response to the user movement, resulting in an updated accessory three-dimensional model and an updated user three-dimensional model; and present, on a display device, via the user interface and based on the updated accessory three-dimensional model and the updated user three-dimensional model, the accessory graphical representation on the user graphical representation in accordance with the user movement.

8. The system of claim 7, wherein the instructions further cause the system to:

obtain one or more images of the user;

identify, based on the one or more images of the user, a set of reference body points;

use the set of reference body points to determine size and depth of user features; and generate, using the set of reference body points and the size and the depth of the user features, the initial user three-dimensional model.

9. The system of claim 8, wherein the instructions further cause the system to:

generate a set of three-dimensional geometries corresponding to a generic user;

modify, using the set of reference body points, the set of three-dimensional geometries, resulting in a modified set of three-dimensional geometries;

create, using the modified set of three-dimensional geometries, a set of occlusion nodes;

detect an overlap between at least one of the set of occlusion nodes and at least one node of the initial accessory three-dimensional model; and hide, via the user interface, a portion of the accessory graphical representation corresponding to the at least one node of the initial accessory three-dimensional model.

10. The system of claim 7, wherein the instructions further cause the system to:

determine, based on the user movement, a change in a user orientation;

apply a physics model to the initial accessory three-dimensional model to update the initial accessory three-dimensional model in accordance with the change in the user orientation, resulting in the updated accessory three-dimensional model; and update, based on the updated accessory three-dimensional model, the user interface to present accessory movement in conjunction with the user movement.

11. The system of claim 7, wherein the initial accessory three-dimensional model includes a set of attachment nodes corresponding to components attachable to the user and a set of joint nodes corresponding to movable components of the accessory.

12. The system of claim 7, wherein the instructions further cause the system to:

evaluate the initial user three-dimensional model to determine a user orientation;

use the user orientation to determine an accessory orientation; and position the accessory graphical representation on to the user graphical representation in accordance with the accessory orientation.

13. A non-transitory computer-readable storage medium storing thereon executable instructions that, as a result of being executed by one or more processors of a computer system, cause the computer system to:

obtain, via a user interface, a request to graphically represent an accessory on a user graphical representation of a user, the user graphical representation generated using an initial user three-dimensional model;

obtain an initial accessory three-dimensional model by:

obtaining a two-dimensional image of the accessory;

generating, using the two-dimensional image of the accessory, an alpha channel image of the accessory; and using the alpha channel image and a set of dimensions of the accessory to generate the initial accessory three-dimensional model;

position, via the user interface and based on an orientation of the initial user three-dimensional model and using the initial accessory three-dimensional model, an accessory graphical representation on to the user graphical representation;

detect user movement;

update the initial user three-dimensional model and the initial accessory three-dimensional model in response to the user movement, resulting in an updated user three-dimensional model and an updated accessory three-dimensional model; and present, on a display device, via the user interface and based on the updated accessory three-dimensional model and the updated user three-dimensional model, the accessory graphical representation on the user graphical representation in accordance with the user movement.

14. The non-transitory computer-readable storage medium of claim 13, wherein the executable instructions further cause the computer system to:

detect, in response to the user movement, an orientation of the user;

apply, based on the orientation of the user, one or more physics models to the initial accessory three-dimensional model to update the initial accessory three-dimensional model;

determine, using the initial accessory three-dimensional model, a new position of the accessory; and use the new position of the accessory to update the accessory graphical representation.

15. The non-transitory computer-readable storage medium of claim 13, wherein the executable instructions further cause the computer system to:

identify, using the initial user three-dimensional model, a set of occlusion nodes;

detect an overlap between at least one of the set of occlusion nodes and at least one node of the initial accessory three-dimensional model; and hide, via the user interface, a portion of the accessory graphical representation corresponding to the at least one node of the initial accessory three-dimensional model.

16. The non-transitory computer-readable storage medium of claim 13, wherein the executable instructions further cause the computer system to:

adjust, based on the orientation of the initial user three-dimensional model, nodes corresponding to the initial accessory three-dimensional model; and use the nodes corresponding to the initial accessory three-dimensional model to position the accessory graphical representation on the user graphical representation.

17. The non-transitory computer-readable storage medium of claim 13, wherein the executable instructions further cause the computer system to:

obtain one or more images of the user;

detect, using the one or more images of the user, a set of body points; and use the set of body points to generate the initial user three-dimensional model.

18. The non-transitory computer-readable storage medium of claim 13, wherein the initial accessory three-dimensional model comprises a set of attachment nodes corresponding to components attachable to the user and a set of joint nodes corresponding to movable components of the accessory.

19. The non-transitory computer-readable storage medium of claim 13, wherein the orientation of the initial user three-dimensional model is determined based on a set of metrics generated based on one or more facial features of the user.

20. The non-transitory computer-readable storage medium of claim 13, wherein the executable instructions that cause the computer system to position the accessory graphical representation on to the user graphical representation further cause the computer system to:

evaluate the initial user three-dimensional model to determine the orientation of the initial user three-dimensional model;

use the orientation of the initial user three-dimensional model to determine an accessory orientation; and position the accessory graphical representation in accordance with the accessory orientation.

* * * * *